(12) United States Patent
Takahashi et al.

(10) Patent No.: US 6,298,823 B1
(45) Date of Patent: Oct. 9, 2001

(54) KNOCK CONTROL APPARATUS FOR INTERNAL COMBUSTION ENGINE

(75) Inventors: Yasuhiro Takahashi; Koichi Okamura; Mitsuru Koiwa; Tsutomu Morishita, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/495,485

(22) Filed: Feb. 1, 2000

(30) Foreign Application Priority Data

Sep. 3, 1999 (JP) .................................................. 11-250215

(51) Int. Cl.[7] .................................................. F02P 5/152
(52) U.S. Cl. ...................................... 123/406.37; 324/399
(58) Field of Search ......................... 123/406.37, 406.38, 123/406.39, 406.29; 324/399

(56) References Cited

U.S. PATENT DOCUMENTS

| 4,846,129 | * | 7/1989 | Noble ................................... 324/399 |
| 5,694,900 | | 12/1997 | Morita et al. ......................... 123/425 |
| 5,751,147 | * | 5/1998 | Nakata et al. ....................... 324/399 |

* cited by examiner

*Primary Examiner*—Erick Solis
(74) *Attorney, Agent, or Firm*—Sughrue, Mion, Zinn, Macpeak & Seas, PLLC

(57) ABSTRACT

A knock control apparatus for suppressing knock event in an internal combustion engine by correcting a control quantity such as ignition timing for the engine while evading erroneous knock decision and erroneous knock control when a spark plug of the engine is in a sooting state. The apparatus includes a means (10) for detecting an ion current (i) flowing by way of the spark plug (8) upon combustion of air-fuel mixture within an engine cylinder being monitored, a filter means (14) for extracting a knock signal (Kj) from an output signal (Ei) of the ion current detecting means (10), a knock decision means (23) for deciding occurrence of a knock event in the engine on the basis of the knock signal (Kj), a control quantity correcting means (24) for correcting the control quantity for the internal combustion engine so as to suppress the knock event on the basis of result (H) of decision, and a sooting state detecting means (25) for detecting a sooting state of the spark plug (8) on the basis of a current signal (Gi) detected through the ion current detecting means (10) during a period in which detection of the ion current (i) is not performed, wherein the sooting state detecting means (25) generates a correction inhibiting signal (M1; M2) for inhibiting correction of the control quantity as performed by the control quantity correcting means (24) on the basis of the decision result (H) the sooting state of the spark plug (8) is detected.

14 Claims, 6 Drawing Sheets

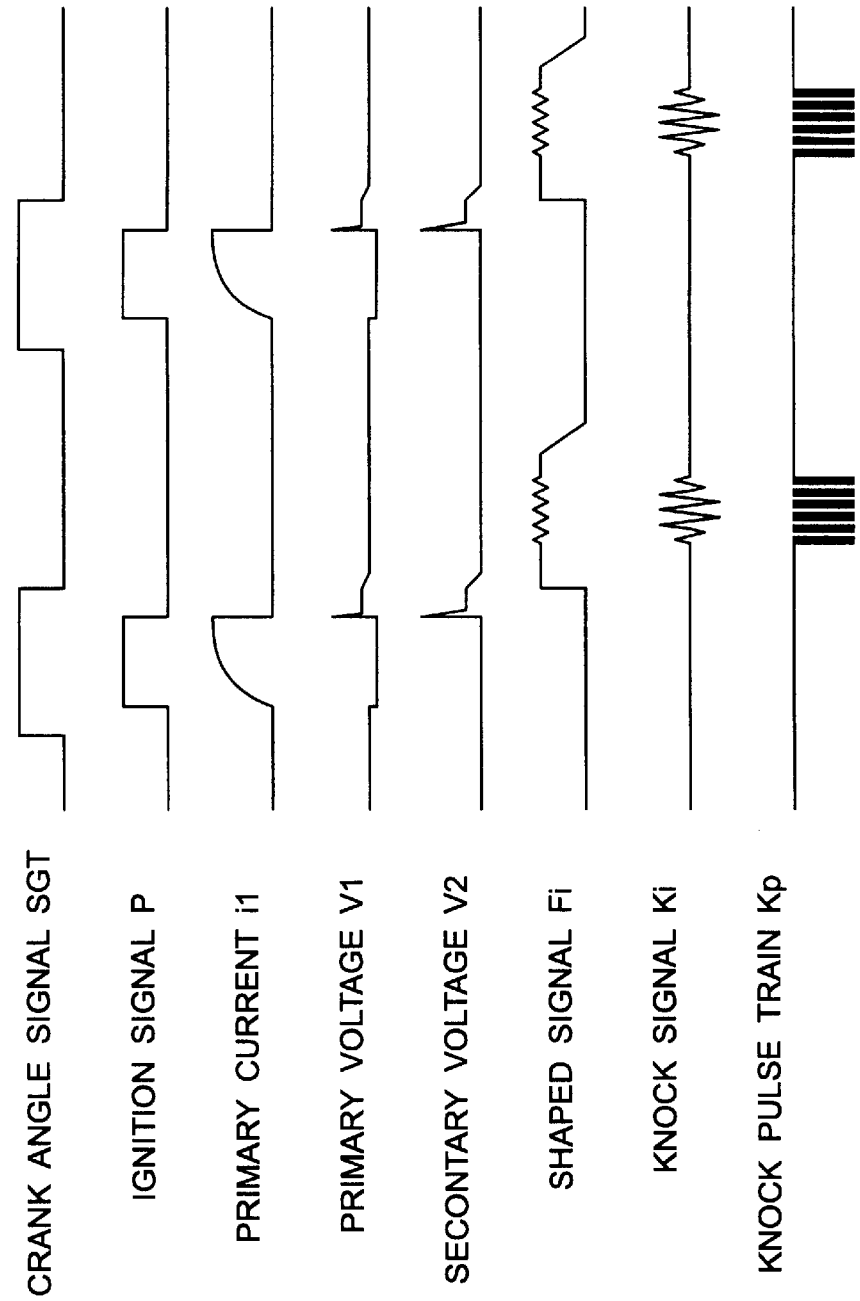

KNOCK CONTROL APPARATUS FOR INTERNAL COMBUSTION ENGINE

BACKGROUND OF THE INVENTION

1. Field of the Invention

The present invention relates to a knock control apparatus for an internal combustion engine, which apparatus is designed for sensing or detecting occurrence of knocking or knock event in the engine on the basis of level change of an ion current which flows by way of a spark plug upon combustion of an air-fuel mixture within the engine cylinder to thereby correct an engine control quantity for suppressing the knocking. More particularly, the invention is concerned with a knock control apparatus for an internal combustion engine, which apparatus is arranged for suppressing erroneous detection of knock event in a sooting state of the spark plug to thereby evade erroneous knock suppression control.

2. Description of Related Art

Heretofore, in the knock control apparatus for the internal combustion engine, the control quantity or quantities for the engine have been so controlled as to suppress knock occurrence (e.g. by retarding the ignition timing, a typical one of engine control quantities) upon detection of knock event with a view to protect the engine against damage or injury due to the knock occurrence.

Further, the knock control apparatus for the internal combustion engine in which the ion current flowing by way of the ignition plug is made use of for the detection of knock event is capable of detecting magnitude of the knock on a cylinder-by-cylinder basis without resorting to the use of a knock sensor, which is advantageous for realizing cost reduction. Heretofore, various types of knock control apparatuses operative on the basis of the ion current have been proposed.

In general, in the internal combustion engine, an air-fuel mixture charged into a combustion chamber defined within each of the engine cylinders is compressed by a piston moving reciprocatively within the cylinder. Subsequently, a high voltage is applied to a spark plug disposed within the cylinder and exposed to the combustion chamber, whereby a spark is generated between electrodes of the spark plug due to electric discharge. Thus, combustion of the compressed air-fuel mixture is triggered. Explosion energy resulting from the combustion is then converted into a movement of the piston in the direction reverse to that of the compression stroke, which motion is translated into a torque outputted from the engine via a crank shaft.

Upon combustion of the compressed air-fuel mixture within the combustion chamber in the engine cylinder, molecules prevailing within the combustion chamber are ionized. Thus, when a high voltage is applied to an ion current detecting electrode which is constituted by an electrode of the spark plug, migration of ions carrying electric charges takes place between the electrodes of the spark plug, which gives rise to generation of an ion current.

As is known in the art, magnitude of the ion current varies with a high sensitively in dependence on the variation in pressure within the combustion chamber and contains vibration components which are ascribable to the knock event. Thus, it is possible to decide on the basis of the ion current whether the knock event has occurred or not.

For having better understanding of the present invention, description will first be made of the technical background in some detail. FIG. 5 is a block diagram showing generally a configuration of a hitherto known or conventional knock control apparatus for an internal combustion engine which is disclosed, for example, in Japanese Unexamined Patent Application Publication No. 9108/1998 (JP-A-10-9108). In the apparatus shown in FIG. 5, a high voltage is applied distributively to spark plugs of individual engine cylinders, respectively, through the medium of a distributor.

The conventional apparatus shown in FIG. 5 is so designed as to extract knocking vibration components superposed on an ion current i for counting knock pulses after waveform shaping of the known vibration components, to thereby make knock decision (i.e., decision as to knock occurrence) on the basis of the pulse counts number.

Referring to FIG. 5, there is provided in association with a crank shaft (not shown) of an internal combustion engine (not shown either and hereinafter also referred to simply as the engine) a crank angle sensor 1 which is adapted to output a crank angle signal SGT containing a number of pulses generated at a frequency which depends on a rotation number or speed (rpm) of the engine.

The leading edges of the individual pulses contained in the crank angle signal SGT indicate angular reference positions for the individual engine cylinders in terms of crank angles, respectively. The crank angle signal SGT is supplied to an electronic control unit (ECU) 2 which may be constituted by a microcomputer, to be used for performing various controls and arithmetic operations therefor.

The electronic control unit 2 includes a counter 21 for counting the number of pulses (also referred to as the pulses number) N of a knock pulse train Kp inputted from a waveform processing means (described later on) and a CPU (central processing unit) 22 for deciding presence or absence of knocking on the basis of the pulses number N.

The counter 21 and the CPU 22 cooperate with the waveform processing means to constitute a knock detecting means.

The electronic control unit 2 is so designed or programmed as to fetch the engine operation information signals from various sensors (not shown) as well as the crank angle signal SGT outputted from the crank angle sensor 1 and perform various arithmetic operations in dependence on the engine operation states, to thereby generate driving signals for a variety of actuators and devices inclusive of an ignition coil 4 and others.

An ignition signal P for the ignition coil 4 is applied to a base of a power transistor TR connected to a primary winding 4a of the ignition coil 4 for turning on/off the power transistor TR. More specifically, the power transistor TR is turned off in response to the driving signal P, whereby a primary current i1 is interrupted.

Upon interruption or breaking of the primary current i1, a primary voltage V1 appearing across the primary winding 4a rises up steeply, as a result of which a secondary voltage V2 further boosted up is induced in a secondary winding 4b of the ignition coil 4 and makes appearance thereacross as a voltage of high level for ignition which is usually on the order of several ten kilovolts. Hereinafter, this voltage will also be referred to as the high ignition voltage or simply as the ignition voltage.

In other words, the ignition coil 4 generates the secondary voltage V2 (high ignition voltage) in conformance with the ignition timings of the engine.

The distributor 7 which is connected to an output terminal of the secondary winding 4b operates so as to distribute and apply the secondary voltage V2 sequentially to spark plugs 8a, . . . , 8d mounted in the engine cylinders, respectively, in synchronism with the rotation of the engine, whereby spark discharges take place within combustion chambers defined within the engine cylinders, respectively, triggering combustion or burning of the air-fuel mixture confined within the combustion chamber.

More specifically, with the spark discharges occurring across the spark plugs 8a, . . . , 8d, respectively, in response to the application of the secondary voltage V2 in conformance with the ignition timing of the engine, the air-fuel mixture within the cylinders is fired or ignited.

Connected between the other end of the primary winding 4a of the ignition coil 4 and the ground is a series circuit which is composed of a rectifier diode D1, a current limiting resistor R, a capacitor 9 connected in parallel with a voltage limiting Zener diode DZ and a rectifier diode D2. The series circuit mentioned above constitutes a path for allowing a charging current to flow to the capacitor 9 which constitutes a bias voltage source serving for supplying a bias voltage for detecting an ion current.

More specifically, the capacitor 9 connected in parallel with the Zener diode DZ (i.e., connected between both terminals of the Zener diode) is electrically charged to a voltage level corresponding to a predetermined bias voltage VBi on the order of several hundred voltages by the charging current which flows under the primary voltage V1. Thus, the capacitor 9 serves as the bias voltage source for detecting the ion current i, as mentioned above. To this end, the capacitor 9 is so connected as to discharge by way of the spark plug (8a, . . . , 8d ) immediately after the ignition, allowing the ion current i to flow therethrough.

Connected to one end of the capacitor 9 are anodes of high-voltage diodes 11a, . . . ,11d, respectively, which have respective cathodes connected to one ends or electrodes of the spark plugs 8a, . . . , 8d, respectively, with a same polarity as that of the firing or ignition voltage. On the other hand, connected to the other end of the capacitor 9 is a resistor 12 for detecting the ion current, which serves to convert the ion current i into a voltage signal and output it as an ion current detection voltage signal Ei.

The resistor 12 is connected to the other ends of the spark plugs 8a, . . . , 8d, respectively, via the ground and forms a path for the ion current i in cooperation with the capacitor 9 and the high-voltage diodes 11a, . . . , 11d.

The ion current detection voltage signal Ei derived from the resistor 12 is shaped by a waveform shaper circuit 13 which thus outputs a waveform-shaped signal Fi. Subsequently, only the knock signal Ki is extracted from the waveform-shaped signal Fi through a band-pass filter 14. The knock signal Ki is then converted to a knock pulse train Kp through a comparison circuit 15 to be ultimately supplied to the counter 21 incorporated in the electronic control unit (ECU) 2.

The waveform shaper circuit 13, the band-pass filter 14 and the comparison circuit 15 cooperate to constitute a waveform processing means for extracting the knock pulse train Kp from the ion current detection voltage signal Ei.

The pulses number N of the knock pulse train Kp is counted by the counter 21 of the electronic control unit 2 to be used for allowing the CPU (central processing unit) 22 to make decision as to whether the knocking occurs or not.

The pulses number N of the knock pulse train Kp bears a significant correlation with the intensity or magnitude of knocking. In other words, the pulses number N increases, as the magnitude of knocking is larger.

Now, referring to FIG. 6 along with FIG. 5, operation of the conventional knock control apparatus for the internal combustion engine will be described.

FIG. 6 is a timing chart for illustrating waveforms of the various signals shown in FIG. 5. It can be seen from FIG. 6 that the knock signal is superposed on the ion current i (see waveform-shaped signal Fi).

The electronic control unit 2 outputs the ignition signal P for turning on/off the power transistor TR on the basis of the crank angle signal SGT derived from the output of the crank angle sensor 1. The power transistor TR electrically conducts (i.e., assumes ON-state) when the ignition signal P is at a high or "H" level, to thereby allow the primary current i1 to flow through the primary winding 4a of the ignition coil 4, while interrupting the current i1 at the time point when the ignition signal P changes from the "H" level to a low or "L" level.

Upon interruption of the primary current i1, the primary voltage V1 rising steeply is induced in the primary winding 4a, as a result of which the capacitor 9 is charged with the current flowing along the charging path constituted by the rectifier diode D1, the current limiting resistor R, the capacitor 9 and the rectifier diode D2. Needless to say, charging of the capacitor 9 is terminated when the voltage appearing across the capacitor 9 has reached the backward breakdown voltage (the bias voltage VBi) of the Zener diode DZ.

In this manner, the capacitor 9, the Zener diode DZ and the diode D2 cooperate to constitute a bias means, wherein the capacitor 9 is charged under the effect of the high voltage making appearance in the primary winding 4a (at low voltage side) upon interruption of the primary current i1.

When the primary voltage V1 makes appearance across the primary winding 4a, there is induced in the secondary winding 4b of the ignition coil 4 the secondary voltage V2 boosted up to a sufficiently high ignition voltage on the order of several ten kilovolts. This secondary voltage V2 is applied distributively to the spark plugs 8a, . . . , 8d of the individual engine cylinders, respectively, by way of the distributor 7, which results in generation of the spark discharge at the plugs within the combustion chambers of the engine cylinders which are under control. Thus, the air-fuel mixture undergoes combustion.

Upon combustion of the air-fuel mixture, ions are produced within the combustion chamber defined in the engine cylinder. The ion current i can thus flow under the bias voltage VBi charged in the capacitor 9. By way of example, let's assume that combustion of the air-fuel mixture takes place within the combustion chamber in which the spark plug 8a is disposed. Then, the ion current i flows along a current path extending from the capacitor 9 to the resistor 12 by way of the diode 11a and the spark plug 8a and then to the capacitor 9.

The ion current i is converted to the ion current detection voltage signal Ei by means of the resistor 12 (serving as the ion current detecting means), whereon the ion current detection voltage signal Ei is shaped to the waveform-shaped signal Fi through the shaper circuit 13.

As can be seen in FIG. 6, the shaped signal Fi is of such waveform which allows the knock signal Ki to be easily extracted by clipping only the ion current component at a predetermined voltage.

When a knocking event occurs in the engine, signal components ascribable to the knocking vibrations are superposed on the ion current i. Thus, the shaped signal Fi also assumes a waveform in which the knocking vibration components are superposed on the ion current.

The waveform-shaped signal Fi is supplied to the band-pass filter 14 and the comparison circuit 15 constituting the waveform processing means.

Thus, the band-pass filter 14 extracts or selects only the knock signal Ki indicating the knocking vibration frequency. On the other hand, the comparison circuit 15 compares the knock signal Ki with a predetermined reference level. As a result, a knock pulse train Kp is outputted from the comparison circuit 15 to be supplied to the counter 21 which is incorporated in the electronic control unit (ECU) 2.

The counter 21 of the electronic control unit 2 is designed to count the pulses number N of the knock pulse train Kp in response to a rising or falling edge of the knock pulse train Kp. The signal indicating the pulses number is then inputted to the CPU 22.

The pulses number N increases as the magnitude of the knocking becomes larger. Thus, the CPU 22 of the electronic control unit 2 can decide or determine the presence or absence of the knocking and magnitude thereof on the basis of the pulses number N.

By virtue of the feature described above, the control quantity (ignition timing) can be so corrected as to suppress the knocking on the basis of the pulses number N.

By way of example, when a count value of the pulses number N becomes equal to or greater than a predetermined number, it is decided that the knocking occurs. In that case, the ignition timing is correctively retarded by a predetermined quantity. Subsequently, when occurrence of the knocking is still decided in succession, the retard quantity is accumulatively increased progressively, which is stopped when the decision results in no occurrence of the knocking.

The predetermined number of pulses (pulses number) which is used as the reference value for comparison for the knock decision can be set to a value of e.g. 5 to 20, although it depends on the engine rotation number and the waveform-shaped level in the comparison circuit 15.

In this way, by determining the retard quantity for retarding correctively the ignition timing in dependence on the result of decision made by the CPU 22, the ignition timing for the cylinder in which the knocking has occurred can be corrected optimally, whereby occurrence of knocking can be suppressed effectively.

However, when the spark plug 8a; . . . ; 8d is in the sooting state in which an insulation resistance value of the plug gap through which the ion current i flows is lowered, a leak current determined by the insulation resistance value and the bias voltage can flow through the plug gap, as a result of which an ion current i containing the leak current will be detected.

In that case, the leak current may contain a lot of vibration components of high frequency which are apt to be detected erroneously as a knock signal. Consequently, there may arise such situation that optimal correction for the ignition timing can not be realized.

As will now be appreciated from the foregoing description, in the case of the knock control apparatus for the internal combustion engine known heretofore, the knock control based on the ion current i can certainly be carried out. However, because the counter measures for coping with occurrence of the sooting state of the spark plugs 8a, . . . , 8d is not provided, noise making appearance in the sooting state may be detected erroneously as the occurrence of knocking, giving rise to a problem.

SUMMARY OF THE INVENTION

In the light of the state of the art described above, it is an object of the present invention to provide a knock control apparatus for an internal combustion engine, which apparatus is so arranged as to suppress the erroneous knock decision and hence the erroneous engine control based on the erroneous knock decision by inhibiting the knock suppression control based on the knock decision when the sooting state takes place in the spark plug, for thereby avoiding improper correction of the control quantity such as the ignition timing of the engine.

In view of the above and other objects which will become apparent as the description proceeds, there is provided according to a general aspect of the present invention a knock control apparatus for an internal combustion engine, which apparatus includes an ignition coil for generating a high ignition voltage in conformance with ignition timing of the internal combustion engine, a spark plug for generating spark discharge in an engine cylinder of the internal combustion engine upon application of the high ignition voltage, an ion current detecting means for detecting an ion current flowing by way of the spark plug upon combustion of air-fuel mixture within the engine cylinder, a filter means for extracting a knock signal from an output signal of the ion current detecting means, a knock decision means for deciding occurrence of a knock event in the engine on the basis of the knock signal, a control quantity correcting means for correcting a control quantity for the internal combustion engine so as to suppress the knock event on the basis of result of decision made by the knock decision means, and a sooting state detecting means for detecting a sooting state of the spark plug on the basis of a current signal detected through the ion current detecting means during a period in which the ion current is not detected, wherein the sooting state detecting means generates a correction inhibiting signal for inhibiting correction of the control quantity as performed by the control quantity correcting means on the basis of the decision result of the knock decision means when the sooting state of the spark plug is detected.

By virtue of the above arrangement, improper correction of the engine control quantity such as, for example, ignition timing can be evaded when the spark plug is in the sooting state, whereby the erroneous knock decision and hence the erroneous knock control can be suppressed effectively.

In a preferred mode for carrying out the invention, the control quantity correcting means may be so implemented as to correct the control quantity for the internal combustion engine by a predetermined degree for suppressing the knock event in response to the correction inhibiting signal.

With the arrangement described above, not only the erroneous knock decision and the erroneous knock control can be evaded but also the knock event taking place during a period in which the knock decision is inhibited can be coped with at least to a certain extent.

In another preferred mode for carrying out the invention, the sooting state detecting means may be so designed or programmed as to clear the correction inhibiting signal to thereby restore the correction of the control quantity as performed by the control quantity correcting means on the basis of the decision result of the knock decision means when the sooting state of the spark plug is no more detected.

Owing to the arrangement described above, there can be realized the knock control apparatus which ensures high reliability for the knock suppression control.

In yet another preferred mode for carrying out the invention, a leak current may be detected by the ion current detection circuit during an exhaust stroke or alternatively during a suction stroke of the engine cylinder, wherein the sooting state detecting means may be so designed or programmed as to detect the sooting state of the spark plug, to thereby generate the correction inhibiting signal when the leak current becomes equal to or greater than a predetermined comparison reference level.

With the above arrangement of the knock control apparatus, the sooting state of the spark plug can be detected with enhanced reliability.

In still another preferred mode for carrying out the invention, a leak current detected by the ion current detection circuit during a suction stroke of the engine cylinder may be used for deciding whether or not the spark plug is in the sooting state.

With the arrangement described above, the sooting state of the spark plug can be detected with high reliability as well.

In a further preferred mode for carrying out the invention, such arrangement may be adopted that the leak current is detected during the exhaust stroke in an ordinary operation state of the internal combustion engine, while the leak current is detected during the suction stroke when the internal combustion engine is operating under light load.

By virtue of the arrangement described above, erroneous detection of the leak current can be suppressed without degrading or impairing the detection sensitivity for the leak current.

In a yet further preferred mode for carrying out the invention, the sooting state detecting means may be so arranged as to perform comparison of the leak current with the comparison reference level plural times during the exhaust stroke or alternatively during the suction stroke, wherein when the leak current is equal to or greater than the comparison reference level over all of the plural times, the sooting state detecting means decides the sooting state of the spark plug.

With the arrangement described above, erroneous detection of the leak current can be evaded more positively.

In a still further preferred mode for carrying out the invention, the sooting state detecting means may be so arranged as to detect the sooting state of the spark plug of the cylinder being monitored when a state in which the leak current detected during the exhaust stroke or alternatively during the suction stroke is equal to or greater than the comparison reference level occurs in succession over a predetermined number of ignition control cycles.

With the arrangement described above, erroneous detection of the leak current can be equally avoided with high reliability.

In a preferred mode for carrying out the invention, the knock control apparatus may further include a temperature sensor means for generating temperature information of the internal combustion engine, wherein the comparison reference level is correctively incremented as the temperature information indicates increasing of the temperature of the engine.

With the arrangement described above, operating state of the engine can be taken into account in detecting the leak current, whereby decision as to occurrence of sooting state at the spark plug can be made with high accuracy.

In another preferred mode for carrying out the invention, such arrangement may be adopted that a noise signal is detected by the ion current detection circuit during electrical energization of the ignition coil, wherein the sooting state detecting means may be so designed or programmed as to detect the sooting state of the spark plug to thereby generate the correction inhibiting signal, when the noise signal becomes equal to or greater than a predetermined comparison reference level.

With the arrangement described above, the erroneous knock decision and hence the erroneous knock control can be evaded.

In yet another preferred mode for carrying out the invention, the sooting state detecting means may be so arranged as to detect the sooting state of the spark plug of the engine cylinder being monitored when a state in which the noise signal is equal to or greater than the comparison reference level takes place in succession over a predetermined number of ignition control cycles.

With the arrangement described above, erroneous detection of the leak current can be suppressed more reliably.

In still another preferred mode for carrying out the invention, the knock control apparatus may further include a filter means for extracting a high-frequency vibration component from the noise signal, wherein the sooting state detecting means is so designed or programmed as to detect the sooting state of the spark plug on the basis of the high-frequency vibration component.

The arrangement described above can ensure more enhanced reliability for the knock suppression control.

In a further preferred mode for carrying out the invention, the sooting state detecting means may be so arranged as to compare an integrated value of the high-frequency vibration component with the comparison reference level.

The arrangement described above can equally ensure high reliability for the knock suppression control.

In a yet further preferred mode for carrying out the invention, the filter means for extracting the high-frequency vibration component from the noise signal may be so arranged as to serve also as the filter means for extracting the knock signal from an ion current detection voltage signal outputted from the ion current detecting means.

With the arrangement described above, the knock control apparatus can be implemented with a simplified structure at low cost.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 6 is a waveform diagram for illustrating operation of the conventional knock control apparatus.

DESCRIPTION OF THE PREFERRED EMBODIMENTS

Figure 1:
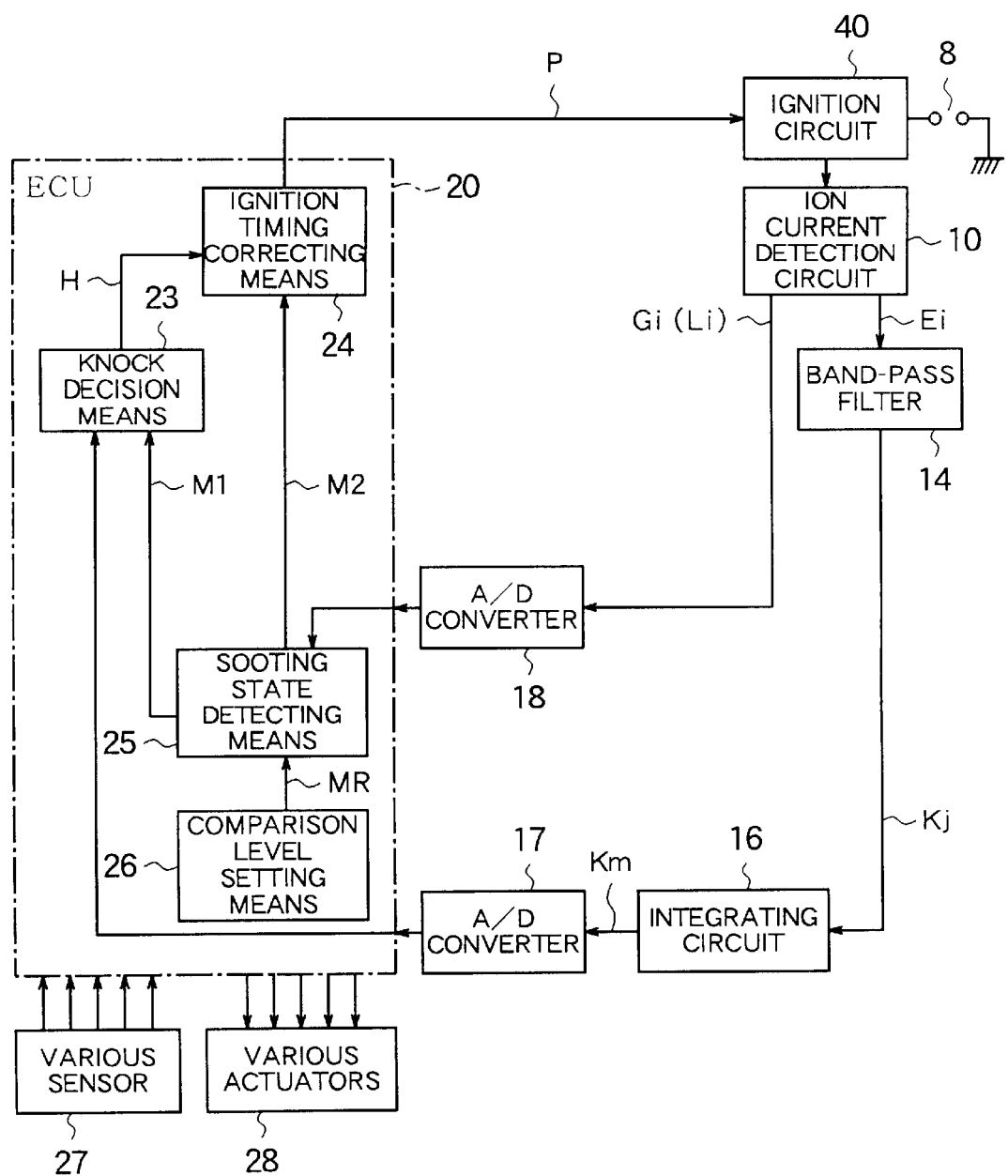
FIG. 1 is a schematic diagram showing generally an arrangement of a knock control apparatus for an internal combustion engine according to a first embodiment of the present invention.

The present invention will be described in detail in conjunction with what is presently considered as preferred or typical embodiments thereof by reference to the drawings. In the following description, like reference characters designate like or corresponding parts throughout the several views.

Embodiment 1

FIG. 1 is a schematic diagram showing generally an arrangement of a knock control apparatus for an internal combustion engine according to a first embodiment of the present invention. In the figure, components like as or equivalent to those described hereinbefore by reference to FIG. 5 are designated by like reference characters and repeated description in detail of these components is omitted.

Referring to FIG. 1, an electronic control unit (ECU) 20 is constituted by a microcomputer, similarly to the electronic control unit 2 described hereinbefore. Additionally, it should be mentioned that only one ignition plug 8 is representatively shown in FIG. 1.

Figure 5:
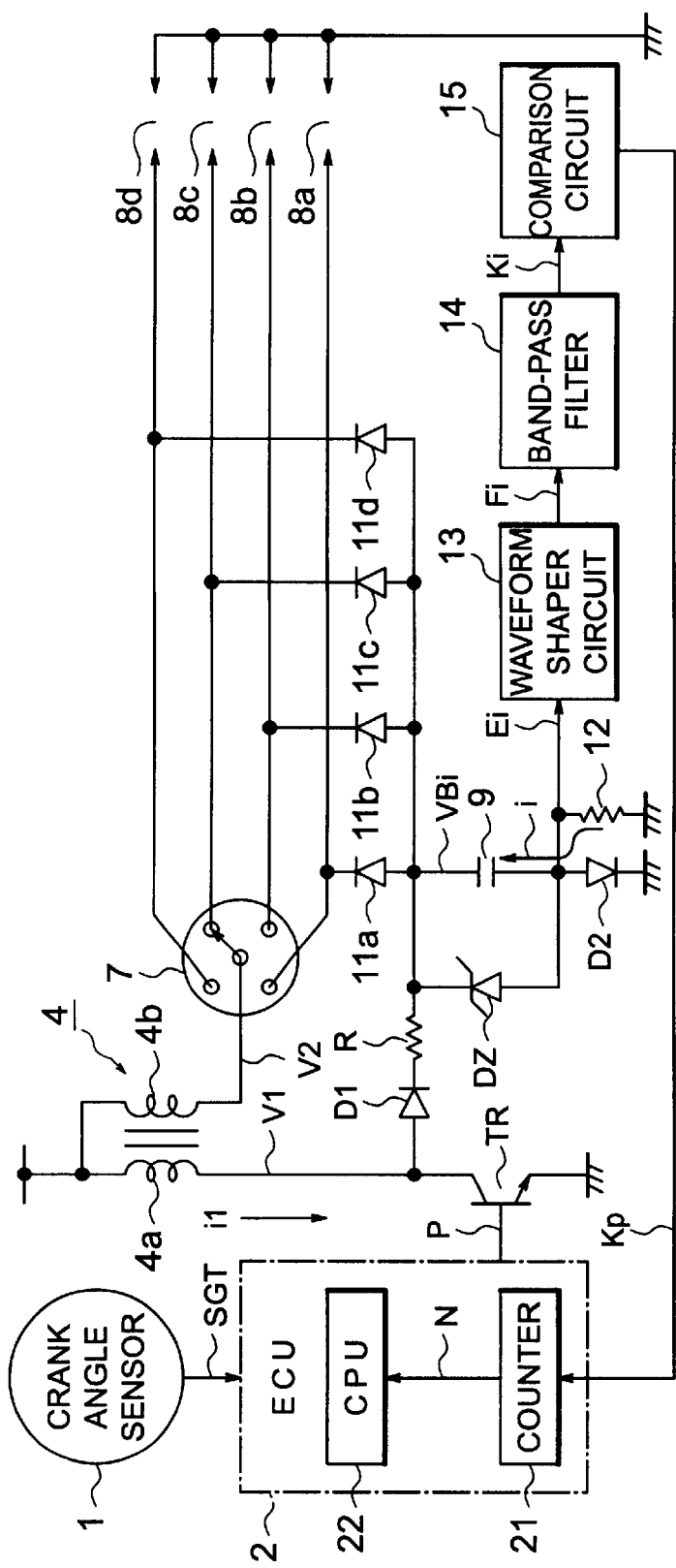
FIG. 5 is a block diagram showing generally a configuration of a conventional knock control apparatus for an internal combustion engine.

An ignition circuit 40 is comprised of a power transistor TR, an ignition coil 4, a distributor 7 and others, as described hereinbefore by reference to FIG. 5. Further, an ion current detection circuit 10 is comprised of a capacitor 9, a resistor 12 and others in such manner as described previously by reference to FIG. 5.

A band-pass filter 14 is so designed as to extract a knock signal Kj from an ion current detection voltage signal Ei outputted from the ion current detection circuit 10. An integrating circuit 16 is provided for integrating the knock signal Kj to thereby generate an integrated signal Km which is converted into a digital signal through an A/D (analogue-to-digital) converter 17 to be subsequently supplied to the electronic control unit (ECU) 20.

In that case, the electronic control unit (ECU) 20 is so designed as to make knock decision on the basis of the integrated signal Km of the knock signal Kj extracted from the ion current detection voltage signal Ei.

An A/D (analogue-to-digital) converter 18 is provided to convert a current signal G1 detected by the ion current detection circuit 10 into a digital signal during periods other than the explosion stroke in which the ion current detection voltage signal Ei is not intrinsically generated. The digital signal is then inputted to the electronic control unit (ECU) 20.

The electronic control unit 20 is comprised of a knock decision means 23 for making decision as to the knock state (i.e., the engine state in which knock event occurs) on the basis of the digitized integrated signal Km, an ignition timing correcting means 24 for retarding correctively the ignition timing (i.e., an engine control quantity) so as to suppress the knocking on the basis of the result H of the decision made by the knock decision means 23, a sooting state detecting means 25 for detecting a sooting state of the spark plug 8 on the basis of the digitized current signal Gi supplied from the A/D converter 18 and a comparison level setting means 26 for generating a comparison reference level MR for the decision concerning the sooting state.

The knock decision means 23 includes a means for determining arithmetically a background level (knock decision level) on the basis of a digital data value of the integrated signal Km. The knock decision means 23 is so designed or programmed as to generate a signal indicative of the decision result H that the knock state is taking place when the integrated signal Km exceeds the background level.

The sooting state detecting means 25 is adapted to generate correction inhibiting signals M1 and M2 for inhibiting the correction of the ignition timing carried out by the ignition timing correcting means 24 on the basis of the result H of the decision performed by the knock decision means 23, when the sooting state of the spark plug 8 is detected by the sooting state detecting means 25.

More specifically, the sooting state detecting means 25 compares the current signal Gi (leak current Li) detected by the ion current detection circuit 10 with the predetermined comparison reference level MR during the exhaust stroke (or suction stroke) of the cylinders of the engine. When the current signal Gi is equal to or exceeds the comparison reference level MR, the sooting state detecting means 25 decides that the spark plug 8 is in the sooting state, to thereby issue the correction inhibiting signals M1 and M2.

Various sensors 27 including the crank angle sensor 1 described hereinbefore are designed to supply temperature information and others indicating the engine operation state to the electronic control unit 20.

Various actuators 28 connected to the electronic control unit (ECU) 20 is driven by control signals outputted from the electronic control unit 20 in dependence on the engine operation state.

Parenthetically, input/output interfaces (not shown) are interposed, respectively, between the electronic control unit (ECU) 20 on one hand and the ignition circuit 40, the various sensors 27 and the various actuators 28 on the other hand.

Figure 2:
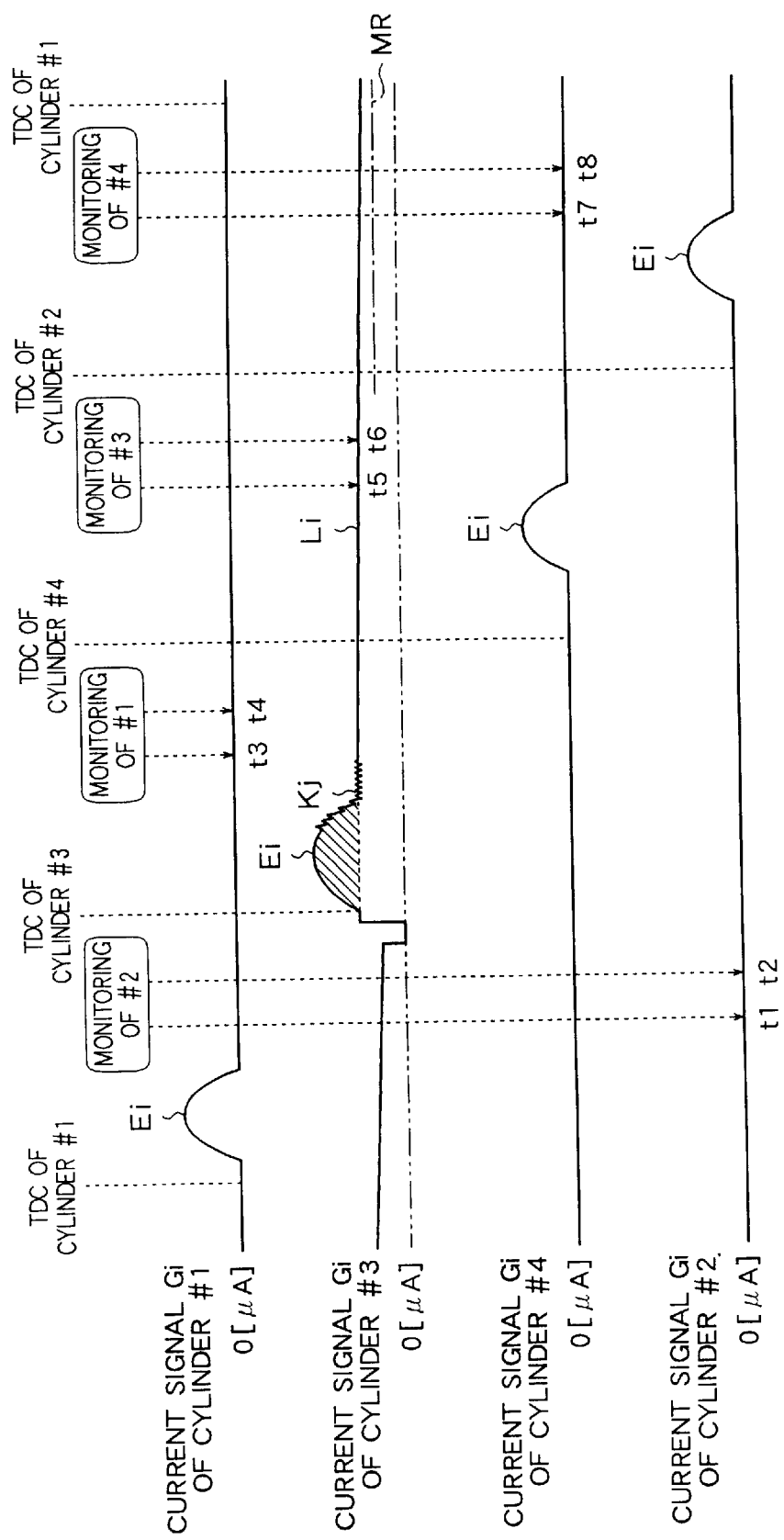
FIG. 2 is a waveform diagram for illustrating operation of the knock control apparatus according to the first embodiment of the invention.

FIG. 2 is a waveform diagram for illustrating operation of the knock control apparatus according to the instant embodiment of the invention. More specifically, there are illustrated current signals Gi detected by the ion current detection circuit 10 for the cylinders (#1 to #4), respectively.

Referring to FIG. 2 in which the time corresponding to the crank angle is taken along the abscissa, the ion current detection voltage signal Ei is generated at time points immediately after time points corresponding to the TDCs (top dead centers) of the relevant engine cylinders (#1, . . . , #4), respectively. At this juncture, it should be mentioned that in practical applications, pulse-like noise is superposed on the current signal Gi immediately after the ignition, even though such phenomenon is omitted from illustration.

In FIG. 2, it is assumed that the spark plug of the cylinder #3 is in the sooting state with a leak current Li flowing and that the ion current detection voltage signal Ei for the cylinder #3 is superposed with the knock signal Kj.

It can be seen from FIG. 2 that during the exhaust strokes of the cylinders, the current signal Gi relevant to the cylinder #2 is monitored at time points t1 and t2, respectively, while the current signal Gi for the cylinder #1 is monitored at time points t3 and t4, respectively. Further, the current signal Gi for the cylinder #3 is monitored at time points t5 and t6 with the current signal Gi for the cylinder #4 being monitored at time points t7 and t8, respectively.

At this juncture, it is to be noted that the sooting state detecting means 25 is so designed or programmed as to compare the current signal Gi with the comparison reference level MR at plural discrete time points during the exhaust stroke. When all the results of the comparisons performed at the plural time points (e.g. t3 and t4 for the cylinder #3) show that the current signal Gi becomes equal to or exceeds the comparison reference level MR, then decision is made to the effect that the spark plug of the cylinder being monitored is in the sooting state. Parenthetically, in the knock control apparatus according to the instant embodiment of the invention, the number of the monitoring time points is set to two (twice) with a view to preventing the arithmetic processing load (i.e., load imposed by the arithmetic processings as involved) from increasing.

Now, referring to FIGS. 2 and 5, description will be made in detail of the operation of the knock control apparatus according to the first embodiment of the present invention shown in FIG. 2.

At first, the power transistor TR and the primary winding 4a of the ignition coil 4 (see FIG. 5) which constitute parts of the ignition circuit 40 undergo the current breaking control in response to the ignition signal P outputted from the electronic control unit (ECU) 20, whereby a secondary voltage v2 (high voltage) is induced in the secondary winding 4b of the ignition coil 4, as described hereinbefore.

The secondary voltage v2 is applied to the spark plug 8 connected to the secondary winding 4b to bring about electric discharge across the gap of the spark plug 8, whereby the air-fuel mixture within the cylinder is fired.

Further, a portion of the ignition energy of the ignition coil 4 is charged in the capacitor 9 included in the ion current detection circuit 10. In this way, the capacitor 9 serves as the bias voltage source for supplying a bias voltage for the ion current detection.

The ion current i is detected as the ion current detection voltage signal Ei which is then supplied to the band-pass filter 14 for extracting the knock signal Kj which is then supplied to the integrating circuit 16, whereby the integrated signal Km is outputted from the integrating circuit 16.

Subsequently, the integrated signal Km is supplied to the A/D (analogue-to-digital) converter 17 to be converted into a digital signal. This signal is then stored in the electronic control unit (ECU) 20. In this manner, the electronic control unit 20 fetches the digital data value of the integrated signal Km every ignition cycle and at the same time resets the integrating circuit 16.

The digital data value of the integrated signal Km is made use of in the knock decision performed by the knock decision means 23 which is incorporated in the electronic control unit (ECU) 20.

The knock decision means 23 is so designed or programmed as to determine arithmetically or calculate the background level on the basis of a value derived by averaging the digital values of the integrated signals Km to thereby make decision as to presence/absence of the knocking and the knock magnitude at the current time on the basis of the result of comparison between the current integrated signal Km (digital value) and the background level.

On the other hand, the ignition timing correcting means 24 is designed to perform correction of the ignition timing of the engine on the basis of the decision result H of the knock decision means 23 such that the ignition timing (primary current breaking time point) for the succeeding ignition cycle is changed in the direction in which the ignition timing is retarded in the succeeding ignition cycle when compared with the timing in the current ignition control.

The current signal Gi (leak current Li) detected twice by the ion current detection circuit 10 at the two discrete monitoring time points (see FIG. 2) during the exhaust stroke of the cylinder under the control is supplied to the sooting state detecting means 25 incorporated in the electronic control unit (ECU) 20 after having been converted into a digital signal through the A/D converter 18 to be compared with the comparison reference level MR for the level decision of the leak current Li.

More specifically, the sooting state detecting means 25 compares the current signal Gi (digital value) detected during the exhaust stroke with the comparison reference level MR, and when the results of comparison carried out twice show that the current signal Gi is equal to or greater than the comparison reference level MR (i.e., Gi M), it is decided that the spark plug of the cylinder being currently monitored is in the sooting state.

At this juncture, it should be mentioned that the comparison reference level MR for the leak decision (i.e., decision as to the leak current) may ordinarily be set to a minimum leak current value at which reliability of the knock detection begins to degrade due to noise superposition or the like.

Although the leak current Li in the sooting state of the spark plug 8 decreases bit by bit after the explosion stroke, as can be seen in FIG. 2, the leak current Li assumes values greater than the comparison reference level MR inclusive thereof over the whole range covering the exhaust stroke, the suction stroke and the compression stroke. Thus, it is possible to detect the sooting state substantially without fail in the exhaust stroke.

When the sooting state is detected, the sooting state detecting means 25 generates the correction inhibiting signals M1 and M2 to thereby disable or inhibit the operations of the knock decision means 23 and the ignition timing correcting means 24, respectively.

As will be appreciated from the foregoing description, the present invention teaches to provide the sooting state detecting means 25 for making decision as to whether the leak current Li is superposed on the ion current detection voltage signal Ei by taking advantage of the fact that the intra-gap insulation resistance value of the spark plug 8 becomes lower as the sooting state occurs therein, to thereby prevent or exclude the erroneous knock decision upon detection of the leak current Li. Owing to this feature, reliability of the knock control operation can be improved very significantly.

More specifically, when the sooting state is detected, the decision operation of the knock decision means 23 is disabled or inhibited and at the same time the correcting operation of the ignition timing correcting means 24 is also inhibited. Thus, erroneous control of the ignition timing based on the erroneous knock decision can be prevented positively, to a great advantage.

To this end, the sooting state detecting means 25 generates the correction inhibiting signals M1 and M2 upon detection of the sooting state when the current signal Gi (leak current Li) exceeds the comparison reference level MR at both the two discrete monitoring time points for each cylinder. Thus, the knock correction inhibiting operation due to erroneous detection of the sooting state can be suppressed, to another advantage.

Although it has been described that the level of the current signal Gi is detected twice during the exhaust stroke of the concerned cylinder being monitored, the present invention is never restricted thereto. The level decision may be made three times or more to ensure much enhanced reliability of the sooting state decision. Besides, the current signal Gi detected during the suction stroke may equally be made use of for making the decision concerning the sooting state.

Furthermore, in consideration of the fact that the leak current Li brought about by the sooting state decreases gradually immediately after the ignition, as can be seen from FIG. 2, the current signal Gi is monitored at relatively earlier time points in succession to the ignition control during the exhaust stroke. By virtue of such arrangement, it is possible to detect the leak current Li with high sensitivity.

Additionally, although it has been described in conjunction with the first embodiment of the invention that the integrated value of the knock signal Kj (integrated signal Km) is used as the digital value for the knock magnitude decision, it goes without saying that the peak value of the knock signal Kj or the duration of knocking vibration or alternatively the number of pulses resulting from waveform shaping of the knock signal Kj with reference to a predetermined threshold level may be used for the knock magnitude decision instead of the integrated value of the knock signal Kj mentioned above.

Embodiment 2

In the case of the knock control apparatus according to the first embodiment of the present invention, the current signal Gi is monitored on the cylinder-by-cylinder basis during the exhaust stroke which succeeds to the explosion stroke. However, the current signal Gi may also be monitored in the suction stroke during a period in which no ion current i can be detected.

In general, in the light load operation state of the internal combustion engine in which the intake air pressure is extremely low, there may occur a combustion phenomenon of a very long duration which is referred to as the after-burning (also known as the late burn). In such after-burning state, there may occur even during the exhaust stroke the ion current due to the intrinsic combustion.

Accordingly, when the engine state in which the after-burning has taken place is taken into consideration, it is desirable to monitor the leak current Li during the suction stroke in order to prevent more positively the erroneous detection of the leak current Li.

Further, such arrangement may equally be adopted that monitoring of the leak current Li is performed during the exhaust stroke in an ordinary engine operation state with the monitoring in the exhaust stroke being inhibited temporarily or being effected temporarily in the suction stroke only in the light load state of the engine.

In this way, the sensitivity of detection of the leak current Li can be protected against degradation in the ordinary engine operation state while ensuring exclusion of erroneous detection of the leak current Li in the light load state of the engine.

Embodiment 3

In the case of the knock control apparatus according to the first embodiment of the invention, the comparison reference level MR preset in the comparison level setting means 26 is used straightforwardly as the reference for comparison with the leak current Li. In this conjunction, such arrangement may be adopted that a basic or original comparison reference level MR as preset is corrected at least with temperature information such as engine intake air temperature (or engine cooling water temperature) or the like to thereby determine the comparison reference level which is ultimately put into effect.

In general, it is known that the ion current i decreases when the engine is in a high-temperature state. In that case, the bias current lowers only a little after the flow of the ion current i. For this reason, the level of the leak current Li tends to increase in dependence on decrease of the ion current when the engine is in the high-temperature state.

Accordingly, it is taught by the invention incarnated in the instant embodiment to provide the comparison level setting means 26 with a correcting means which is so designed or programmed that when the intake air temperature of the engine is high, the comparison reference level MR for the leak-current decision is increased correspondingly. In that case, the decision as to the sooting state can be realized with further enhanced reliability.

As the parameters which exert influence to the current signal Gi, there may be conceived other factors than the temperature information. The influence of these other factors or parameters can be satisfactorily compensated for by correcting the comparison reference level MR similarly to the case described above.

Embodiment 4

In the knock control apparatus according to the first embodiment of the invention, the sooting state detecting means 25 is so arranged as to prevent only the erroneous knock decision and hence the erroneous control by generating the correction inhibiting signals M1 and M2 only when the sooting state of the spark plug 8 is detected. In this conjunction, it is to be noted that when the sooting state becomes no more detectable, the correction inhibiting signals M1 and M2 may be cleared to thereby allow the correcting operation to be performed for the control quantity by the ignition timing correcting means 24 on the basis of the decision result H of the knock decision means 23.

In general, it is also known that the sooting state of the spark plug 8 is caused to disappear as the ignition control is performed repetitively because contamination of the spark plug 8 will then be burnt up.

Thus, according to the invention incarnated in the instant embodiment, it is proposed to clear the correction inhibiting signals M1 and M2 at the time point the current signal Gi detected during the exhaust stroke resumes a level lower than the comparison reference level MR, to thereby validate the operations of the knock decision means 23 and the ignition timing correcting means 24, respectively.

To this end, the sooting state detecting means 25 may be so designed or programmed that when the state in which the current signal Gi is lower than the comparison reference level MR (i.e., Gi<MR) is decided in succession over plural ignition cycles (e.g. twice in succession for the cylinder being monitored), the correction inhibiting signals M1 and M2 for the cylinder being monitored are cleared. In that case, decision as to the soot-cleared state can be imparted with a certain degree of redundancy.

Parenthetically, it should be added that generation or enabling and clearing of the correction inhibiting signals M1 and M2 corresponds, for example, to flag on/off operation or operation for changing over the voltage signal between high and low levels.

Thus, by generating or validating the correction inhibiting signals M1 and M2 upon detection of the leak current Li (i.e., sooting state) while clearing or invalidating the correction inhibiting signals M1 and M2 when the leak current Li is no more detected to thereby allow the knock decision control function to be resumed, reliability of the knock control operation can further be enhanced.

Embodiment 5

In the knock control apparatus according to the first embodiment of the invention, the correction control based on the knock decision is inhibited or disabled by the correction inhibiting signals M1 and M2 only when the sooting state is detected. However, the ignition timing correction may be performed to a certain extent so as to cope with the knock event occurring in the state where the knock decision is inhibited. The fifth embodiment of the present invention is directed to such arrangement.

Thus, according to the invention incarnated in the fifth embodiment, the ignition timing correcting means 24 is so arranged or programmed as to inhibit in response to the correction inhibiting signal M1 the knock decision for the cylinder for which the sooting state has been detected while it responds to the correction inhibiting signal M2 by retarding correctively the ignition timing by a predetermined degree (i.e., by shifting the ignition timing toward the knock suppression side) for the cylinder for which the sooting state has been detected.

Thus, by retarding correctively the ignition timing by a certain degree (minimum degree) upon disabling of the knock decision while preventing excessive retarding of the ignition timing due to erroneous knock decision, sufficient protection can be ensured for the engine.

In this conjunction, it should be mentioned that the extent of the corrective control (i.e., ignition timing correcting quantity) validated upon inhibition of the knock decision may be set or determined on the basis of the ignition timing correcting quantity (quantities) for the other cylinder(s).

Embodiment 6

In the knock control apparatus according to the first embodiment of the invention, the sooting state detecting means 25 is designed or programmed to compare the current signal Gi with the comparison reference level MR plural times during the exhaust stroke (or suction stroke) for the purpose of suppressing the erroneous knock detection. However, the sooting state detecting means 25 may be so arranged that the decision as to the sooting state is made on the basis of the result of the comparison performed only once.

Embodiment 7

In the knock control apparatus according to the first embodiment of the invention, the sooting state detecting means 25 is so designed or programmed as to detect occurrence of the sooting state (leak current Li) on the basis of level comparison of the current signal Gi detected during the exhaust stroke (or suction stroke) in a single ignition control cycle. However, with a view to suppressing further the erroneous detection, the sooting state detecting means 25 may be arranged such that the sooting state of the spark plug of the concerned cylinder being monitored can be ultimately determined when the sooting state has been detected in succession over a predetermined number of the ignition control cycles for the cylinder being monitored.

Embodiment 8

In the knock control apparatus according to the first embodiment of the invention, the sooting state detecting means is so designed or programmed as to detect the sooting state on the basis of the current signal Gi (leak current Li) detected during the exhaust stroke (or suction stroke). However, the sooting state detecting means may be so arranged as to detect the sooting state (i.e., determine occurrence of the sooting state) when the current signal Gi (a noise signal) detected during electrical energization of the ignition coil 4 attains or exceeds the comparison reference level. The eighth embodiment of the invention is directed to the arrangement mentioned just above.

In general, it is known that upon start of the primary current i1 flowing through the ignition coil 4, a negative or minus voltage of the polarity reverse to that of the high ignition voltage is induced in the secondary winding 4b at low voltage side, as a result of which a pulse-like noise is generated and outputted by the ion current detection circuit 10 as the current signal Gi.

In that case, when the spark plug 8 is in the sooting state with the gap insulation resistance value being lowered, noise signal will be generated by the ion current detection circuit 10 as the current signal Gi in succession to the above-mentioned pulse-like noise upon start of the flowing of the primary current i1. The level of the noise signal can be determined in dependence on the high voltage of positive polarity (voltage of plus or positive polarity) induced in the secondary winding 4b at the high voltage side and the gap insulation resistance value of the spark plug 8.

Furthermore, it is known that the noise signal succeeding to the pulse-like noise is superposed with high-frequency vibration component.

Accordingly, it is possible to detect the sooting state with further enhanced reliability by extracting the high-frequency vibration component from the noise signal by the filter means in addition to the level decision of the current signal Gi (noise signal) detected during the electrical energization of the ignition coil 4.

Figure 3:
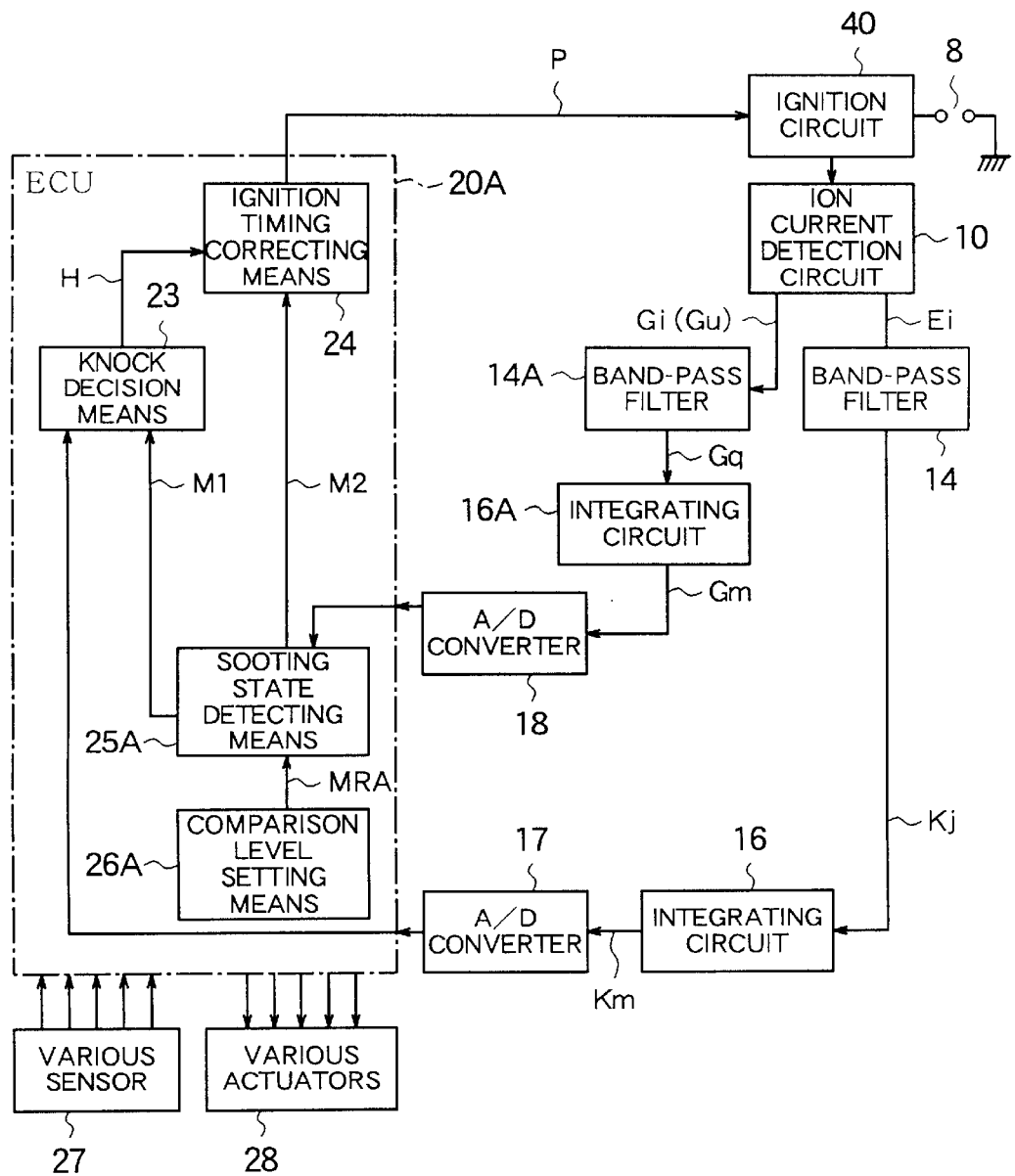
FIG. 3 is a block diagram showing generally and schematically a knock control apparatus for an internal combustion engine according to an eighth embodiment of the present invention.

Now, the knock control apparatus according to the eighth embodiment of the invention which is so designed as to detect the sooting state on the basis of the result of the level decision of the current signal Gi (noise signal) detected during the electrical energization of the ignition coil 4 will be described by reference to the drawing. FIG. 3 is a block diagram showing generally and schematically the knock control apparatus according to the eighth embodiment of the present invention, in which parts or components same as or equivalent to those described hereinbefore by reference to FIG. 1 are denoted by like reference numerals and detailed description thereof will be omitted.

Referring to FIG. 3, in the knock control apparatus according to the instant embodiment of the invention, there are provided an electronic control unit 20A, a sooting state detecting means 25A and a comparison level setting means 26A which functionally correspond, respectively, to the electronic control unit 20, the sooting state detecting means 25 and the comparison level setting means 26 described hereinbefore.

A band-pass filter 14A is provided for extracting a high-frequency vibration component Gq from the current signal Gi detected during electrical energization of the ignition coil 4 (i.e., noise signal ascribable to the leak current flowing in the sooting state), while an integrating circuit 16A integrates the high-frequency vibration component Gq to thereby output an integrated signal Gm.

The integrated signal Gm is inputted to the electronic control unit (ECU) 20A after having been converted into a digital signal through an A/D converter 18 to be compared with a comparison reference level MRA by a sooting state detecting means 25A.

In this manner, by performing the level determination of the integrated signal Gm by taking advantage of the high-frequency vibration component Gq contained in the current signal Gi (noise signal) detected during electrical energization of the ignition coil 4, presence/absence of the sooting state (leak current) can be detected, whereby the erroneous knock decision can be evaded similarly to the knock control apparatus described hereinbefore.

Embodiment 9

In the knock control apparatus according to the eighth embodiment of the invention described above, the high-frequency vibration component Gq is extracted from the current signal Gi (noise signal) by means of the band-pass filter 14A. However, the current signal Gi detected during the electrical energization of the ignition coil 4 may be inputted directly to the integrating circuit 16A for generating an integrated signal, substantially to the same effect. In that case, the band-pass filter 14A may be spared, to an advantage.

Embodiment 10

In the knock control apparatus according to the eighth embodiment of the invention, the high-frequency vibration component Gq is integrated by the integrating circuit 16A for generating the integrated signal Gm which is made use of for the level decision. However, the high-frequency vibration component Gq may be straightforwardly used for the level decision with the integrating circuit 16A being omitted.

Thus, according to the invention incarnated in the instant embodiment thereof, the high-frequency vibration component Gq is converted into a digital value which is then compared with the comparison reference level MRA. When the peak value or the pulses number of the digital value becomes equal to or greater than the comparison reference level MRA, it is then determined that the sooting state prevails.

Embodiment 11

In the knock control apparatus according to the eighth embodiment of the invention, the sooting state detecting means 25A is so arranged as to detect the sooting state (leak state) on the basis of the level decision of the current signal Gi detected during one electrical energization cycle. In the knock control apparatus according to the eleventh embodiment of the invention, the sooting state of the spark plug of the cylinder being monitored is determined when the sooting state is detected in succession over a predetermined number of ignition control cycles (i.e., electrical energization cycles) for the same cylinder concerned. By virtue of this arrangement, erroneous decision can be suppressed more positively.

Embodiment 12

In the knock control apparatus according to the eighth embodiment of the invention, there are provided the band-pass filter 14A, the integrating circuit 16A and the A/D converter 18 for processing the current signal Gi to detect the sooting state. By contrast, in the knock control apparatus according to the twelfth embodiment of the invention, such arrangement is adopted that the band-pass filter 14, the integrating circuit 16 and the A/D converter 17 provided for processing the ion current detection voltage signal Ei can be used for processing additionally the current signal Gi as well.

To this end, the output signal of the A/D converter 17 is inputted not only to the knock decision means 23 but also to the sooting state detecting means 25A. In that case, the band-pass filter 14A, the integrating circuit 16A and the A/D converter 18 shown in FIG. 3 can be spared, to advantage.

Figure 4:
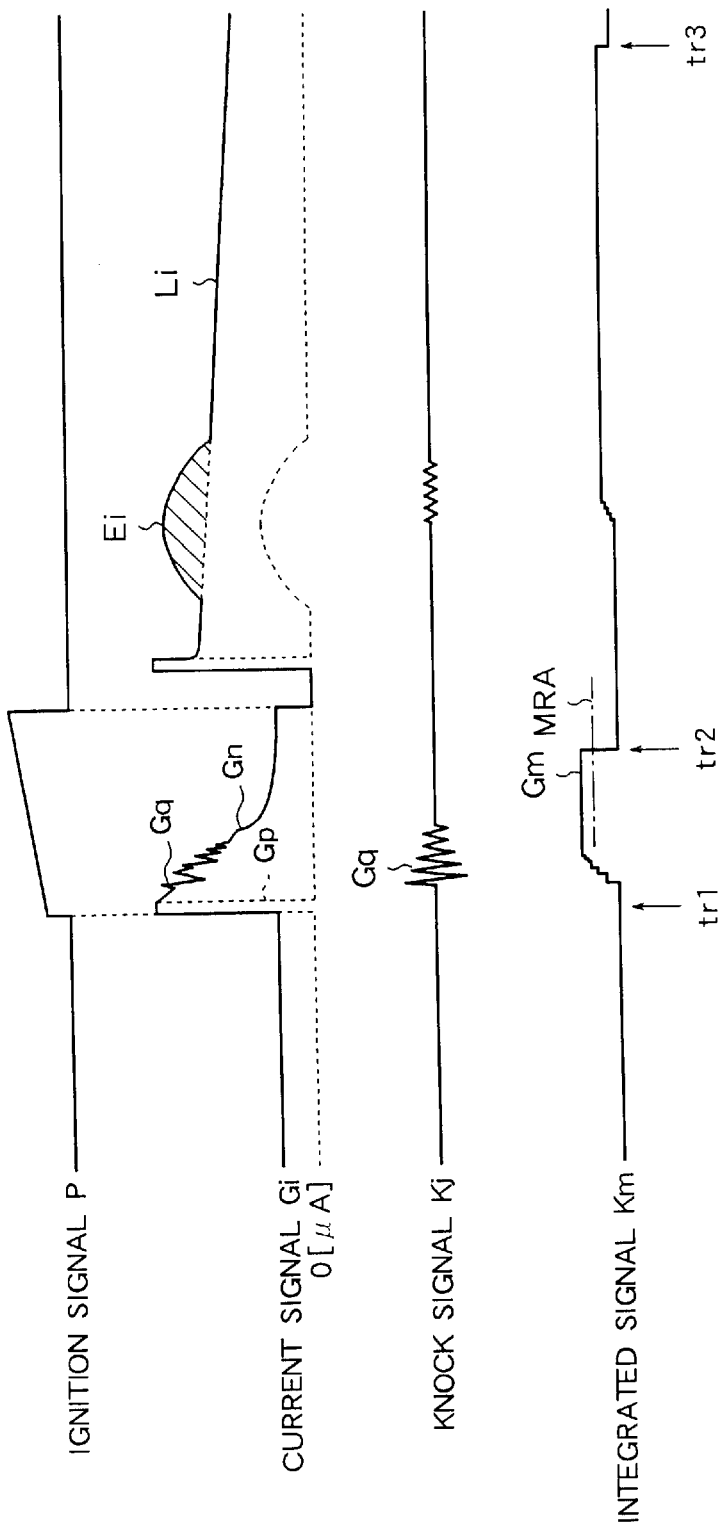
FIG. 4 is a waveform diagram for illustrating operation of the knock control apparatus according to a twelfth embodiment of the invention.

FIG. 4 is a waveform diagram for illustrating operation of the knock control apparatus according to the twelfth embodiment of the invention in which the band-pass filter 14A (see FIG. 3) for extracting the high-frequency vibration component Gq is arranged to serve also as the band-pass filter 14 for extracting the knock signal Kj.

More specifically, referring to FIG. 4, changes of the ignition signal P, the current signal Gi, the knock signal Kj and the integrated signal Km as a function of time are illustrated for a given cylinder which is in the sooting state although no knocking occurs.

In the waveform of the current signal Gi shown in FIG. 4, a broken-line curve represents the waveform when no leak current flows (i.e., when the sooting state does not take place). Further, time points tr1, tr2 and tr3 represent the timing at which the data value of the integrating circuit 16 is reset by the electronic control unit 20A.

The ion current detection circuit 10 (see FIG. 3) is so designed as to output not only the ion current detection voltage signal Ei immediately after the ignition but also the pulse-like noise Gp synchronized with the ignition signal P and the noise signal Gn as the current signal Gi.

More specifically, upon electrical energization of the ignition coil 4 in response to the ignition signal P, the ion current detection circuit 10 outputs the noise signal Gn containing the high-frequency vibration component Gq ascribable to the leak current as the current signal Gi in succession to the pulse-like noise Gp.

On the other hand, the band-pass filter 14 extracts the high-frequency vibration component Gq superposed on the noise signal Gn to thereby output the former as the knock signal Kj.

Further, the integrating circuit 16 integrates the high-frequency vibration component Gq during the electrical energization of the ignition coil 4, whereby the integrated signal Gm resulting from the integration is outputted as the integrated signal Km.

The electronic control unit (ECU) 20A resets the integrated signal Km of the integrating circuit 16 at the time point tr1, i.e., the rising time point of the ignition signal P, in precedence to execution of the level decision of the integrated signal Gm by the sooting state detecting means 25A. The integrated signal Km is again reset by the electronic control unit 20A at the time point tr2 after the integrated signal Gm has been acquired as the data.

Further, the electronic control unit 20A resets the integrated signal Km once more at the time point tr3 after the knock decision means 23 has acquired the integrated signal Km as the data for the knock decision on the basis of the integrated signal Km.

By resetting the data value(s) of the integrated signal Km at the time points tr1, tr2 and tr3, respectively, as described above, level decision for the integrated signal Gm and the integrated signal Km can be performed accurately on the basis of one series of digital values as acquired, whereby the sooting state and the knock state can be determined with high accuracy.

As will now be appreciated, in the knock control apparatus according to the instant embodiment of the invention, the band-pass filter 14, the integrating circuit 16 and others can be used in common to different types of operations, which in turn means that the circuit configuration of the knock control apparatus can be simplified while allowing the knock control apparatus to be realized at low cost, to a great advantage.

At this juncture, it should be added that the high-frequency vibration component Gq superposed on the noise signal Gn has a frequency slightly higher than the knock frequency in the strict sense, which will however give rise to substantially no problem in practical applications by setting properly the band of the band-pass filter 14.

MODIFICATIONS

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, in the knock control apparatuses according to the first to twelfth embodiments described above, the digital value of the current signal Gi containing the ion current detection voltage signal Ei is adopted for the level decision. However, a pulse signal resulting from waveform shaping of the current signal Gi with reference to a predetermined threshold level may be used for the level decision.

Accordingly, all suitable modifications and equivalents may be resorted to, falling within the spirit and scope of the invention.

What is claimed is:

1. A knock control apparatus for an internal combustion engine, comprising:
   an ignition coil for generating a high ignition voltage in conformance with ignition timing of said internal combustion engine;
   a spark plug for generating spark discharge in an engine cylinder of said internal combustion engine upon application of said high ignition voltage;
   ion current detecting means for detecting an ion current flowing by way of said spark plug upon combustion of air-fuel mixture within said engine cylinder;

filter means for extracting a knock signal from an output signal of said ion current detecting means;

knock decision means for deciding occurrence of a knock event in said engine on the basis of said knock signal;

control quantity correcting means for correcting a control quantity for said internal combustion engine so as to suppress the knock event on the basis of result of decision made by said knock decision means; and sooting state detecting means for detecting a sooting state of said spark plug on the basis of a current signal detected through said ion current detecting means during a period in which said ion current is not detected, wherein said sooting state detecting means generates a correction inhibiting signal for inhibiting correction of said control quantity as performed by said control quantity correcting means on the basis of said decision result of said knock decision means when the sooting state of said spark plug is detected.

2. A knock control apparatus for an internal combustion engine according to claim 1, wherein said control quantity correcting means corrects said control quantity for said internal combustion engine by a predetermined degree for suppressing the knock event in response to said correction inhibiting signal.

3. A knock control apparatus for an internal combustion engine according to claim 1, wherein said sooting state detecting means clears said correction inhibiting signal to thereby restore the correction of said control quantity as performed by said control quantity correcting means on the basis of said decision result of said knock decision means when the sooting state of said spark plug is no more detected.

4. A knock control apparatus for an internal combustion engine according to claim 1, wherein said current signal is composed of a leak current detected by said ion current detection circuit during an exhaust stroke or alternatively during a suction stroke of the engine cylinder, and wherein when said leak current becomes equal to or greater than a predetermined comparison reference level, said sooting state detecting means detects the sooting state of said spark plug, to thereby generate said correction inhibiting signal.

5. A knock control apparatus for an internal combustion engine according to claim 4, wherein said current signal is composed of a leak current detected by said ion current detection circuit during a suction stroke of the engine cylinder.

6. A knock control apparatus for an internal combustion engine according to claim 4, wherein said current signal is composed of said leak current detected during said exhaust stroke in an ordinary operation state of said internal combustion engine, and wherein said current signal is changed over to the leak current detected during said suction stroke when said internal combustion engine is operating under light load.

7. A knock control apparatus for an internal combustion engine according to claim 4, wherein said sooting state detecting means is so arranged as to perform comparison of said leak current with said comparison reference level plural times during said exhaust stroke or alternatively during said suction stroke, and wherein when said leak current is equal to or greater than said comparison reference level over all of said plural times, said sooting state detecting means decides the sooting state of said spark plug.

8. A knock control apparatus for an internal combustion engine according to claim 4, wherein said sooting state detecting means is so arranged as to detect the sooting state of said spark plug of the cylinder being monitored when a state in which said leak current detected during said exhaust stroke or alternatively during said suction stroke is equal to or greater than said comparison reference level occurs in succession over a predetermined number of ignition control cycles.

9. A knock control apparatus for an internal combustion engine according to claim 4, further comprising:

temperature sensor means for generating temperature information of said internal combustion engine, wherein said comparison reference level is correctively incremented as said temperature information indicates increasing of the temperature of said engine.

10. A knock control apparatus for an internal combustion engine according to claim 1, wherein said current signal is composed of a noise signal detected by said ion current detection circuit during electrical energization of said ignition coil, and wherein said sooting state detecting means is so arranged as to detect the sooting state of said spark plug to thereby generate said correction inhibiting signal, when said noise signal becomes equal to or greater than a predetermined comparison reference level.

11. A knock control apparatus for an internal combustion engine according to claim 10, wherein said sooting state detecting means is so arranged as to detect the sooting state of said spark plug of the engine cylinder being monitored when a state in which said noise signal is equal to or greater than said comparison reference level takes place in succession over a predetermined number of ignition control cycles.

12. A knock control apparatus for an internal combustion engine according to claim 10, further comprising:

filter means for extracting a high-frequency vibration component from said noise signal, wherein said sooting state detecting means is so arranged as to detect the sooting state of said spark plug on the basis of said high-frequency vibration component.

13. A knock control apparatus for an internal combustion engine according to claim 12, wherein said sooting state detecting means is so arranged as to compare an integrated value of said high-frequency vibration component with said comparison reference level.

14. A knock control apparatus for an internal combustion engine according to claim 12, wherein said filter means for extracting said high-frequency vibration component from said noise signal is so arranged as to serve also as said filter means for extracting said knock signal from an ion current detection voltage signal outputted from said ion current detecting means.

* * * * *